United States Patent
Dodley

[11] Patent Number: 6,151,373
[45] Date of Patent: Nov. 21, 2000

[54] WEAK SIGNAL RESOLVER

[75] Inventor: Jeevan Prakash Dodley, Parsippany, N.J.

[73] Assignee: AT&T Corp., New York, N.Y.

[21] Appl. No.: 08/832,544

[22] Filed: Apr. 3, 1997

[51] Int. Cl.[7] .................................................. H03D 1/06
[52] U.S. Cl. .................... 375/348; 375/349; 455/306; 455/307
[58] Field of Search ...................... 375/316, 350, 375/346, 348, 349; 455/33.1, 59–60, 132–135, 307, 24, 63, 206, 265, 276.1, 284, 306, 311

[56] References Cited

U.S. PATENT DOCUMENTS

| | | | |
|---|---|---|---|
| 3,621,401 | 11/1971 | Young, Jr. ................................. | 375/349 |
| 4,287,475 | 9/1981 | Eaton et al. ............................... | 328/167 |
| 4,320,523 | 3/1982 | Horikawa et al. ........................ | 455/207 |
| 4,326,294 | 4/1982 | Okamoto et al. ......................... | 455/139 |
| 4,408,350 | 10/1983 | Donath ...................................... | 455/206 |
| 4,613,978 | 9/1986 | Kurth et al. ............................... | 455/308 |
| 4,673,982 | 6/1987 | Tam et al. ................................. | 358/167 |
| 4,972,430 | 11/1990 | Cantwell ................................... | 375/200 |
| 5,235,621 | 8/1993 | Amir-Alikhani .......................... | 375/200 |
| 5,282,023 | 1/1994 | Scarpa ...................................... | 348/624 |
| 5,353,301 | 10/1994 | Mitzlaff .................................... | 375/200 |
| 5,410,750 | 4/1995 | Cantwell et al. ......................... | 455/306 |
| 5,461,646 | 10/1995 | Anvari ...................................... | 375/347 |
| 5,502,747 | 3/1996 | McGrath ................................... | 375/350 |
| 5,517,529 | 5/1996 | Stehlik ...................................... | 375/316 |
| 5,619,536 | 4/1997 | Gourge ..................................... | 375/316 |
| 5,652,768 | 7/1997 | Ritter et al. .............................. | 375/316 |
| 5,668,837 | 9/1997 | Dent ......................................... | 375/316 |
| 5,748,677 | 5/1998 | Kumar ...................................... | 375/285 |
| 5,764,171 | 6/1998 | Stikvoort .................................. | 375/316 |

FOREIGN PATENT DOCUMENTS

| | | |
|---|---|---|
| 61-158223 | 7/1986 | Japan . |
| 62-281620 | 12/1987 | Japan . |
| 62-284536 | 12/1987 | Japan . |
| 2268023 | 11/1990 | Japan . |
| 3113538 | 11/1991 | Japan . |
| 6244745 | 9/1994 | Japan . |
| 7154315 | 6/1995 | Japan . |

*Primary Examiner*—Don N. Vo
*Attorney, Agent, or Firm*—Banner & Witcoff, Ltd.

[57] ABSTRACT

A receiver is provided in which a composite signal is split into two paths. In the first path, a desired signal channel is suppressed by a notch filter. The remaining channels in the composite signal are inverted. In the second path, the signal is delayed to match the delay imposed by the first path. The signal from the first path is recombined with the second path, which reduces the signal level of the undesired channels to the level of quantization noise. The desired signal can then be amplified using the full dynamic range of the amplifier circuitry. If desired, more than one channel may be received at a time. Further, if the two or more channels that are being received have different signal strengths, the digital filtering functions of the notch filter can be used to selectively weight the signals to equalize their strengths. In addition, channels of different bandwidths can be received.

6 Claims, 3 Drawing Sheets

FIG. 4

| POWER LEVELS IN dBm AT THE OUTPUT OF: (OPERATION IN TO 50Ω) | P1: AVG. SIGNAL (dBm) | P1: MAX QUANTIZATION NOISE (dBm) | P1: (SNR) QUANTIZATION (dB) | P2: AVG. SIGNAL (dBm) | P2: MAX QUANTIZATION NOISE (dBm) | P2: (SNR) QUANTIZATION (dB) |
|---|---|---|---|---|---|---|
| A/D — 68     70 | -10 | -61.17 | 51.17 | -52 | -61.17 | 9.17 |
| DIGI. NOTCH FILTER | -10 | -61.17 | 51.17 | -85 | -94.17 | 9.17 |
| D/A — 72 | -10 | -61.17 | 51.17 | ~-85 | ~-94.17 | 9.17 |
| COMBINER — 80 | SMALL | -61.17 | SMALL | ~-52 | -94.17 | 42.17 |

WEAK SIGNAL RESOLVER

FIELD OF THE INVENTION

This invention relates to radio frequency communications, and more particularly, to radio frequency communications circuitry for resolving weak signals among stronger signals in a closely spaced frequency spectrum.

BACKGROUND OF THE INVENTION

Amplifiers in multicarrier systems must have good large signal performance to avoid generating intermodulation distortion products at their outputs. This is particularly true in wireless receivers, which must often resolve a weaker signal among stronger signals. In dual down conversion receivers, a narrowband filter may be located after the second mixer to attenuate the strong but undesired signals and to pass the desired weak signal. By reducing the magnitude of the undesired signals, a greater fraction of the dynamic range of the amplifier circuitry in such a receiver can be used to amplify the desired signal. However, such a receiver arrangement imposes stringent requirements on the narrowband filter and other components used in the receiver.

Receivers that digitally sample the entire band of channels do not have such stringent filter requirements. However, the analog-to-digital converter and associated amplifier circuitry used in such digital sampling receivers must be able to handle large signals. When strong signals dominate, the signal-to-noise ratio of the weak signal is reduced considerably.

It is therefore an object of the present invention to provide improved circuitry for resolving weak signals from adjacent stronger signals.

SUMMARY OF THE INVENTION

This and other objects of the invention are accomplished in accordance with the principles of the present invention by providing a receiver in which an incoming composite radio frequency signal is down-converted to an intermediate frequency signal and split into two paths. In the first path, a desired signal channel is attenuated by a notch filter. The remaining channels in the composite signal are inverted. In the second path, the signal is delayed to match the delay imposed by the first path. The signal from the first path is recombined with the second path, which reduces the signal level of the undesired channels to the level of quantization noise. The desired signal can then be amplified using the full dynamic range of the amplifier circuitry in the receiver. The amplified signal is processed and demodulated using an analog-to-digital converter, a digital tuner, and a demodulator.

If desired, more than one channel may be received at a time. Further, if the two or more channels that are being received have different signal strengths, the digital filtering functions of the notch filter can be used to selectively weight the signals to equalize their strengths. Equalizing the strengths of the desired signals allows the amplification functions of the receiver to be performed using the entire dynamic range of the requisite amplifier circuitry, thereby increasing the signal-to-noise ratio of the receiver.

The receiver can also accommodate channels of different bandwidths by varying the bandwidth of the signal that is attenuated by the notch filter.

Further features of the invention, its nature and various advantages will be more apparent from the accompanying drawings and the following detailed description of the preferred embodiments.

BRIEF DESCRIPTION OF THE DRAWINGS

FIG. 4 is a table showing signal power levels, quantization noise power levels, and signal-to-noise ratios at the outputs of various stages of the receiver of FIG. 3, as implemented according to an illustrative design example.

DETAILED DESCRIPTION OF THE PREFERRED EMBODIMENTS

Figure 1:
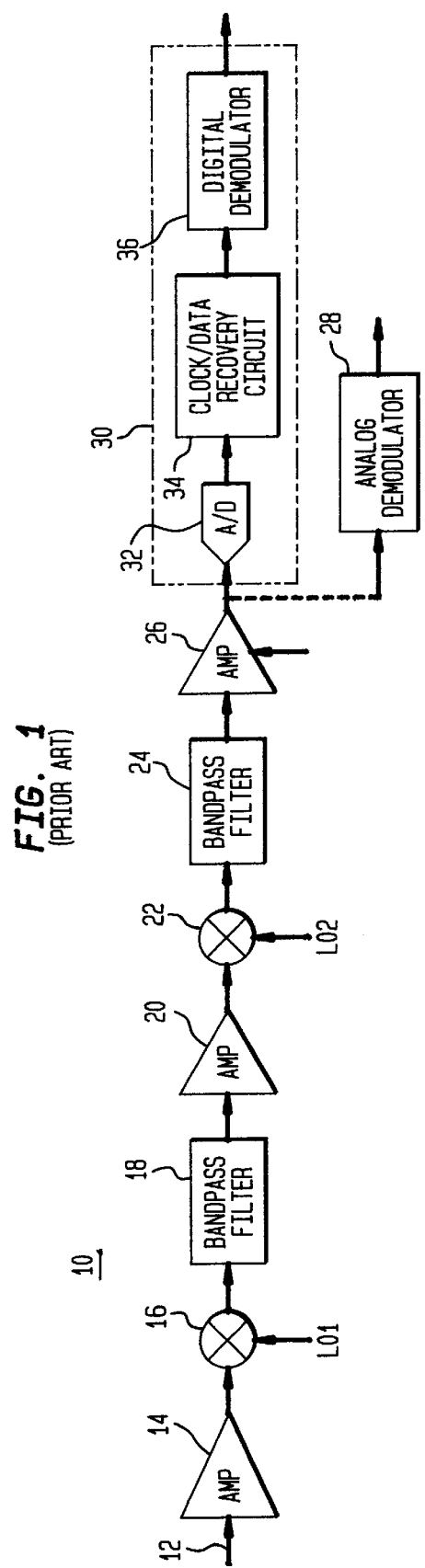
FIG. 1 is a diagram of a prior art dual down conversion receiver.

As shown in FIG. 1, dual down conversion receiver 10 receives radio frequency input signals at input 12 of low noise amplifier 14. The radio frequency input signals are contained in number of separate channels. In some instances it is desired to resolve a weak signal on one channel from strong signals on other channels. Mixer 16 mixes local oscillator LO 1 with the output of amplifier 14, thereby down-converting the input radio frequency signals to a first intermediate frequency. Bandpass filter 18 provides image rejection (i.e., suppresses signals at the image frequency).

All channels (strong and weak) are passed to the output of bandpass filter 18 and received by amplifier 20. Mixer 22 mixes local oscillator LO 2 with the output of amplifier 20, thereby down-converting the input to mixer 22 to a second intermediate frequency. Bandpass filter 24 passes the channel of interest (e.g., the weak channel) to automatic gain control amplifier 26 and blocks the remaining channels. Amplifier 26 amplifies the signal at its input to the appropriate level for demodulation.

Some receivers use an analog demodulator such as analog demodulator 28 to demodulate the output of amplifier 26. Other receivers use a digital demodulator arrangement such as provided by demodulator circuitry 30 containing analog-to-digital converter 32, clock/data recovery circuit 34, and digital demodulator 36.

Regardless of which approach is used for demodulation, the arrangement of FIG. 1 has a number of disadvantages. For example, using the second bandpass filter (bandpass filter 24) places stringent requirements on the filter and synthesizers used for the local oscillators. In addition, because bandpass filter 24 has a fixed bandwidth, only channels with that fixed bandwidth can be received.

Figure 2:
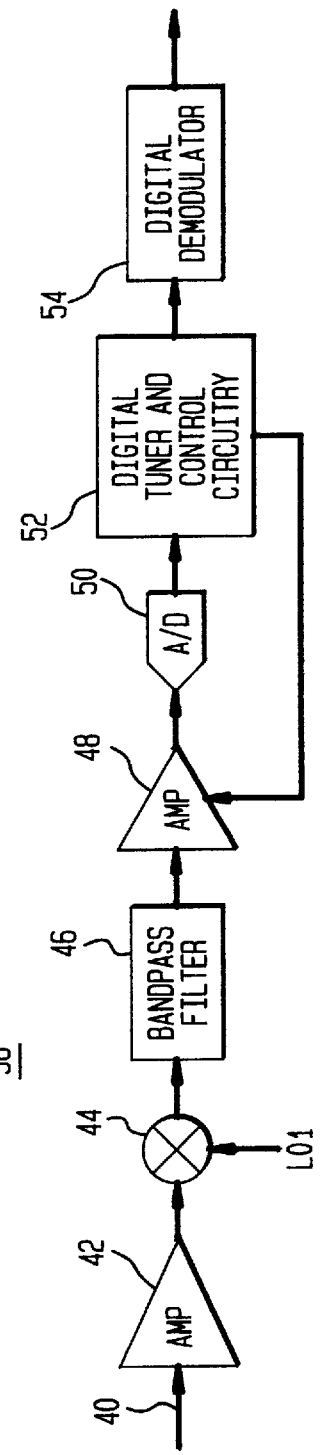
FIG. 2 is a diagram of a prior art receiver that uses digital sampling.

An alternative prior art receiver arrangement is shown in FIG. 2. Receiver 38 receives radio frequency input signals at input 40 of amplifier 42. Mixer 44 mixes the output of amplifier 42 with the signal from local oscillator LO 1 to down-convert the signal to an intermediate frequency. The output of mixer 44 is fed to bandpass filter 46, which serves as an antialiasing filter. The output of bandpass filter 46 contains all of the channels (strong and weak). Automatic gain control amplifier 48 provides an amplified composite signal formed from these channels to analog-to-digital converter 50. The desired channel is selected from the output of analog-to-digital converter 50 by the tuner portion of digital tuner and control circuitry 52 and demodulated by digital demodulator 54.

The arrangement of FIG. 2 avoids the stringent requirements that are placed on bandpass filter 24 and the local oscillator synthesizers in receiver 10 of FIG. 1. However, in receiver 38 of FIG. 2, analog-to-digital converter 50 and amplifier 48 must be capable of handling large signals. If the input signal to be resolved is weaker than other signals in the intermediate frequency spectrum, the amplification of the weaker signal will not be substantial, because the gain of amplifier 48 will be dominated by the stronger signals. Analog-to-digital converter 50 will therefore not be able to produce a sufficient number of resolvable bits for the weaker signal, which results in a poor signal-to-noise ratio (SNR) for the weaker signal. (The signal-to-noise ratio is defined herein as the ratio of the root-mean-square (rms) signal to the maximum quantization noise.)

In addition, low cost monolithic automatic gain control amplifiers typically cannot handle large signal levels, so that the input level to automatic gain control amplifier 48 must be reduced to ensure that intermodulation distortion at the output of amplifier 48 is maintained below an acceptable level. The magnitude of the required signal level reduction is approximately proportional to the square root of the number of channels in the system.

In accordance with the present invention, an incoming composite signal is split into two parallel paths. In the first path a desired signal is removed from the composite signal. The composite signal with the desired signal removed is effectively subtracted from the original composite signal (in the second path), thereby eliminating all but the desired signal from the composite signal. Because the desired (weak) signal is no longer accompanied by strong undesired signals, this arrangement allows the full dynamic range of the amplifier and analog-to-digital converter circuitry in the receiver to be used effectively.

Figure 3:
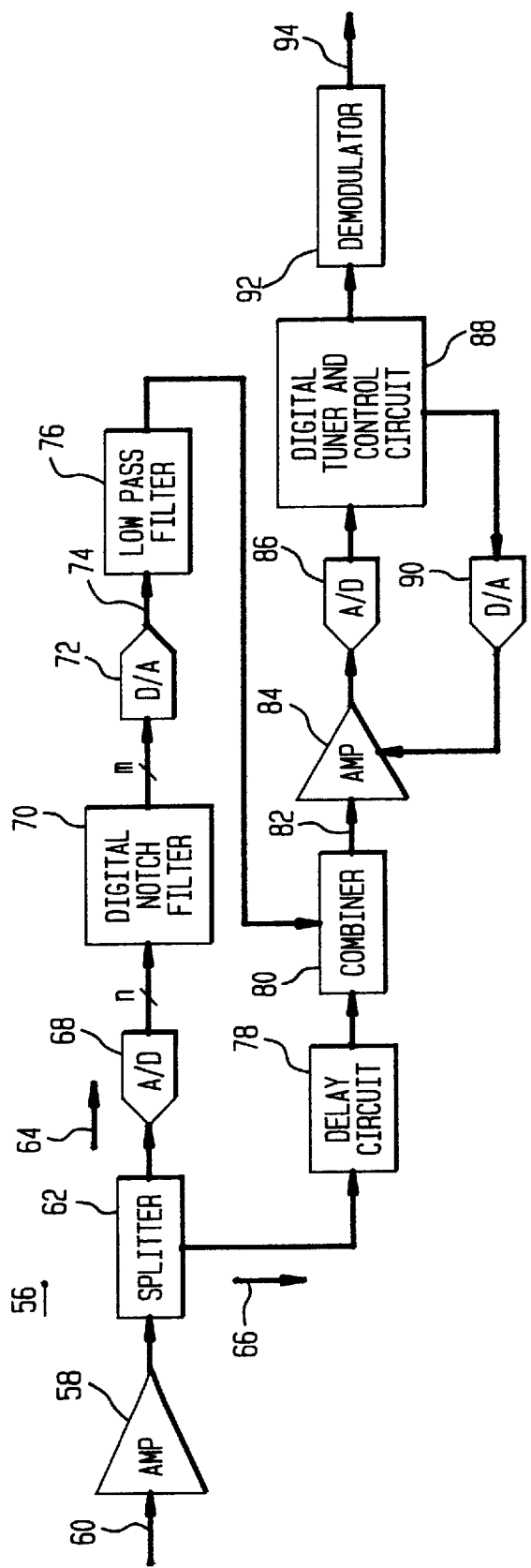
FIG. 3 is a diagram of an illustrative embodiment of the present invention.

A receiver 56 constructed in accordance with the present invention is shown in FIG. 3. If desired, receiver 56 can be implemented on a digital very large scale integrated circuit. Receiver 56 receives radio frequency input signals and converts them to an intermediate frequency using conventional techniques. For example, receiver 56 may use a low noise amplifier, mixer, and bandpass filter such as those shown at the inputs of receivers 10 (FIG. 1) and 38 (FIG. 2). The intermediate frequency output of the receiver is presented to amplifier 58 at input 60. The level of the input signal presented to input 60 is preferably maintained as high as possible without creating intermodulation distortion products. The intermediate frequency input signal is a composite of signals from multiple channels. Receiver 56 detects and demodulates the signals on at least one of these channels. In general, the desired signal or signals may be weak and the undesired signals strong.

Splitter 62 is provided to split the output signal from amplifier 58 into paths 64 and 66. The composite signal is essentially unchanged along path 66. In path 64, the desired signal is suppressed and the undesired signals inverted, so that when the signals from paths 64 and 66 are recombined, the uninverted undesired signals from path 66 are cancelled by the inverted undesired signals from path 64. This arrangement allows the desired weak signal that remains to be processed using the full dynamic range of the receiver amplifier and digitizing circuitry.

The output of splitter 62 along path 64 is digitized by analog-to-digital converter 68, which has a resolution of n bits. Digital notch filter 70 has coefficients that can be programmed dynamically to select a center frequency, desired filter shape, and desired bandwidth. Notch filter 70 attenuates the desired channel and passes the remaining channels unaltered. The output of digital notch filter 70 has m bits of resolution. The value of m must be sufficiently large to avoid swamping the notched channel with quantization noise.

The quantization noise that is produced in the desired channel by analog-to-digital converter 68 is subsequently attenuated by digital notch filter 70, so that it is generally acceptable for analog-to-digital converter 68 to produce more noise than digital-to-analog converter 72. The value of m is therefore generally greater than n. (If desired, the resolution of analog-to-digital converter 68 can be increased by increasing the value of n (even so that n is greater than m), but this is typically unnecessary and may add cost and complexity to the overall design.) The quantization noise in the desired channel after digital-to-analog converter 72 is determined by the contributions of the noise output (S) from notch filter 70 and the quantization noise (M) produced by the m bits of resolution of digital-to-analog converter 72. (S is the power due to noise from analog-to-digital converter 68 as attenuated by notch filter 70.) Preferably, the magnitude of S is close to the magnitude of M. Balancing the noise contributions S and M in this way utilizes the n bit resolution of analog-to-digital converter 68, the processing power of notch filter 70, and the m bit resolution of digital-to-analog converter 72 to the fullest.

The output of digital notch filter 70, which contains all of the channels in the composite signal except the channel of interest, is provided to digital-to-analog converter 72, which generates a corresponding analog output signal at output 74. The analog output signal is inverted in relation to the composite signal provided to path 66. Lowpass filter 76 is preferably provided to smooth out any signals related to the clock oscillator frequencies of digital-to-analog converter 72.

In path 66, delay circuit 78 generates a delay to match the delay introduced by path 64. (If desired, digital notch filter 70 may provide delay equalization functions to assist delay circuit 78 in matching the delay introduced by path 64.) The unaltered composite signal from delay circuit 78 is combined with the signal from lowpass filter 76 by combiner 80. The signal at output 82 of combiner 80 is made up primarily of the desired signal. The signals in the undesired channels are attenuated to the level of quantization noise (i.e., to a maximum of one half of a least significant bit). The signal at output 82 is provided to automatic gain control amplifier 84, which can now use its full dynamic range to process the desired signal.

The output of amplifier 84 is provided to analog-to-digital converter 86, which provides a corresponding digital output to digital tuner and control circuit 88. The control portion of digital tuner and control circuit 88 is used to adjust the gain of automatic gain control amplifier 84 via digital-to-analog converter 90 based on the amplitudes of the signals at the input to amplifier 84. The digital tuner portion of digital tuner and control circuit 88 converts the desired channel to baseband (i.e., to 0 Hz carrier frequency). Digital tuner and control circuit 88 preferably also has low-pass circuitry to enhance the selectivity of the tuner. During single channel reception, most selectivity is provided by digital notch filter 70, which relaxes the requirements for filtering in digital tuner and control circuit 88. The output of digital tuner and control circuit 88 is demodulated by demodulator 92 and provided at output 94.

The receiver arrangement of FIG. 3 reduces the dynamic range of the signal provided to amplifier 84, so that the large signal handling requirements of the amplifier 84 can be relaxed. In addition, the output of amplifier 84 is now almost entirely made up of the desired signal, so that analog-to-digital converter 86 can digitize this signal with a higher resolution than possible when the undesired large signals occupied the entire dynamic range of analog-to-digital converter 86.

The ability of receiver 56 to resolve weak channels among strong channels is particularly useful in environments such as cellular telephone systems. In cellular telephone systems, users approaching the edge of a cell are often in situations in which the desired channel has weaker signals than many of the other channels in the system.

If desired, receiver 56 can handle multiple channels simultaneously, by notching out additional channels with notch filter 70 and by modifying digital tuner and control circuit 88 and demodulator 92 to tune to and demodulate these additional channels. Further, notch filter 70 can weight different channels by different amounts to compensate for variations in signal strength. For example, a cellular telephone base station may need to receive channel 4 (weak) and channel 5 (strong) and may want to suppress the remaining channels (strong). With the arrangement of FIG. 3, notch filter 70 can provide notch filtering of both channels 4 and 5, simultaneously. Because channel 5 is strong and channel 4 is weak, it may be beneficial to filter out channel 5 only partially, so that the magnitude of channel 5 at the output of combiner 80 is reduced somewhat. Balancing the relative magnitudes of the signals from different channels at the input to amplifier 84 makes the greatest use of the dynamic range of amplifier 84 and increases the overall ability of the system to resolve both desired channels (4 and 5).

Another capability of receiver 56 is to handle channels of differing bandwidths. Such an arrangement may be useful, for example, in an environment in which radio station channels are provided using both standard bandwidths and larger bandwidths (e.g., to provide compact disc quality audio). The characteristics of digital notch filter 70 can be selectively varied to accommodate both the narrower and the wider channels, as needed. When a regular channel is being received, notch filter 70 suppresses a regular-sized bandwidth channel. When a compact disk quality channel is being received, notch filter 70 suppresses a larger-sized bandwidth channel.

The characteristics of receiver 56 can be further illustrated with the following design example. In this example, two channels are represented by two carriers for simplicity. The undesired stronger carrier is P1 having a power level of −10 dBm. The desired weaker carrier is P2 having a power level of −52 dBm (i.e., 42 dB below the strong signal). Analog-to-digital converter 68 has 10 bits of resolution (i.e., n=10) and a full scale maximum of 400 mV peak-to-peak (one least significant bit (lsb) is equal to 390.625 $\mu$V). Digital-to-analog converter 72 has 16 bits of resolution (i.e., m=16) and produces an output of 400 mV peak-to-peak maximum (one lsb equals 6.104 $\mu$V). Digital notch filter 70 has 16 or more bits of resolution.

The −10 dBm (200 mV peak-to-peak) level of P1 is represented by nine bits of analog-to-digital converter 68 output. The −52 dBm (~1.5 mV peak-to-peak) level of P2 is represented by 2 bits of analog-to-digital converter 68 output. The maximum quantization noise power into 50 Ω after analog-to-digital converter 68 is ~−61.17 dBm maximum, as given by Equation 1.

$$\text{Max\_Quantization\_Noise\_Power} = (\tfrac{1}{2}\,\text{lsb})^2 / 50 \tag{1}$$

The ratio of the average signal to the maximum quantization noise for P1 is 51.17 dB and for P2 is 9.17 dB. If digital notch filter 70 attenuates 33 dB in the desired channel, the levels for the various stages of receiver 56 using the illustrative design are as shown in the table of FIG. 4.

The output levels at digital-to-analog converter 72 are −10 dBm for P1 (unchanged) and −85 dBm (attenuated) for P2. When the output of lowpass filter 76 is added to the input signal at combiner 80, P1 is cancelled and the value of P2 is decreased by −85 dBm (−52 dBm−33 dBm), which results in an output at combiner 80 of −52.002 dBm, as given by Equation 2.

$$\text{Output} = 10 * \log(10^{-5.2} - 10^{-8.5}) \tag{2}$$

Equation 2 demonstrates that in this idealized example the magnitude of the desired signal at the output of combiner 80 is reduced by a negligible amount. In practice, digital-to-analog converter 72 adds quantization noise to the desired signal. If digital-to-analog converter 72 has 8 bits of resolution, so that 0.4 V peak-to-peak is represented by 8 bits, the maximum quantization noise level will be −49 dBm. This level is higher than the signal level P2, so that P2 will be swamped by quantization noise. (This is also the case with 10 bits of resolution.) If however, digital-to-analog converter 72 has 16 bits of resolution, the maximum quantization noise added by digital-to-analog converter 72 will be only −97.3 dBm, which is less than the noise level for the desired channel at the output of digital notch filter 70. Accordingly, the signal level of P2 at amplifier 84 will have a signal-to-noise ratio (quantization limited) for the desired signal of 42 dB (94−52). A 7 bit analog-to-digital converter 86 will therefore use its full capabilities in digitizing the desired weak signal P2. Selecting an appropriate combination of resolutions for digital-to-analog converter 72 and analog-to-digital converter 86 therefore allows the required signal-to-noise ratio to be obtained for the desired channel. In the present example, the weak signal is resolved to approximately 7 bits. The signal levels seen by amplifier 84 are −52 dBm for P2 and −61 dBm for P1 (i.e., the strong signal power is at the level of quantization noise). Because the undesired composite signals are 9 dB below the desired signal, the desired signal can easily be amplified by amplifier 84.

The foregoing is merely illustrative of the principles of this invention and various modifications can be made by those skilled in the art without departing from the scope and spirit of the invention.

What is claimed is:

1. A receiver for resolving at least one desired signal from among undesired signals in a composite signal, comprising:
   a splitter for splitting the composite signal into a first path and a second path;
   means for attenuating the at least one desired signal in the composite signal in the first path without converting the composite signal to baseband; and
   a combiner for combining the signal from the first path and the signal from the second path to produce an output signal containing the at least one desired signal in which the undesired signals have been attenuated, wherein:
   the at least one desired signal comprises a first desired signal and a second desired signal; and
   the means for attenuating attenuates the stronger of the first and second signals less than the weaker of the first and second signals to equalize the magnitudes of the first and second desired signals in the output signal.

2. A receiver for resolving at least one desired signal from among undesired signals in a composite signal, comprising:
   a splitter for splitting the composite signal into a first path and a second path;
   means for attenuating the at least one desired signal in the composite signal in the first path without converting the composite signal to baseband; and a combiner for combining the signal from the first path and the signal from the second path to produce an output signal containing the at least one desired signal in which the undesired signals have been attenuated, wherein the means for attenuating comprises a digital notch filter, the receiver further comprising:

an analog-to-digital converter in the first path between the splitter and the digital notch filter; and a digital-to-analog converter in the first path between the digital notch filter and the combiner.

3. A receiver for resolving at least one desired signal from among undesired signals in a composite signal, comprising:

a splitter for splitting the composite signal into a first path and a second path;

means for attenuating the at least one desired signal in the composite signal in the first path without converting the composite signal to baseband; and a combiner for combining the signal from the first path and the signal from the second path to produce an output signal containing the at least one desired signal in which the undesired signals have been attenuated, wherein the means for attenuating comprises a digital notch filter, the receiver further comprising:

an analog-to-digital converter in the first path between the splitter and the digital notch filter; and a digital-to-analog converter in the first path between the digital notch filter and the combiner, wherein the analog-to-digital converter has a lower resolution than the digital-to-analog converter.

4. A method for using a receiver to resolve at least one desired signal from among undesired signals in a composite signal, comprising:

splitting the composite signal into a first path and a second path;

attenuating the at least one desired signal in the composite signal in the first path without converting the composite signal to baseband; and combining the signal from the first path and the signal from the second path to produce an output signal containing the at least one desired signal in which the undesired signals have been attenuated, wherein the at least one desired signal comprises a first desired signal and a second desired signal, the method further comprising the step of attenuating the stronger of the first and second signals less than the weaker of the first and second signals to equalize the magnitudes of the first and second desired signals in the output signal.

5. A method for using a receiver to resolve at least one desired signal from among undesired signals in a composite signal, comprising:

splitting the composite signal into a first path and a second path;

attenuating the at least one desired signal in the composite signal in the first path without converting the composite signal to baseband; and combining the signal from the first path and the signal from the second path to produce an output signal containing the at least one desired signal in which the undesired signals have been attenuated, wherein the step of attenuating comprises the step of using a digital notch filter to attenuate the at least one desired signal, the method further comprising the steps of:

digitizing the signal in the first path with an analog-to-digital converter before the desired signal is attenuated; and converting the signal in the first path to an analog signal with a digital-to-analog converter after the desired signal has been attenuated and before the signal in the first path has been combined with the signal in the second path.

6. A method for using a receiver to resolve at least one desired signal from among undesired signals in a composite signal, comprising:

splitting the composite signal into a first path and a second path;

attenuating the at least one desired signal in the composite signal in the first path without converting the composite signal to baseband; and combining the signal from the first path and the signal from the second path to produce an output signal containing the at least one desired signal in which the undesired signals have been attenuated, wherein the step of attenuating comprises the step of using a digital notch filter to attenuate the at least one desired signal, the method further comprising the steps of:

digitizing the signal in the first path with an analog-to-digital converter before the desired signal is attenuated; and converting the signal in the first path to an analog signal with a digital-to-analog converter after the desired signal has been attenuated and before the signal in the first path has been combined with the signal in the second path, wherein the analog-to-digital converter digitizes the signal in the first path with less resolution than used by the digital-to-analog converter to convert the signal to analog.

* * * * *